United States Patent Office 3,551,315
Patented Dec. 29, 1970

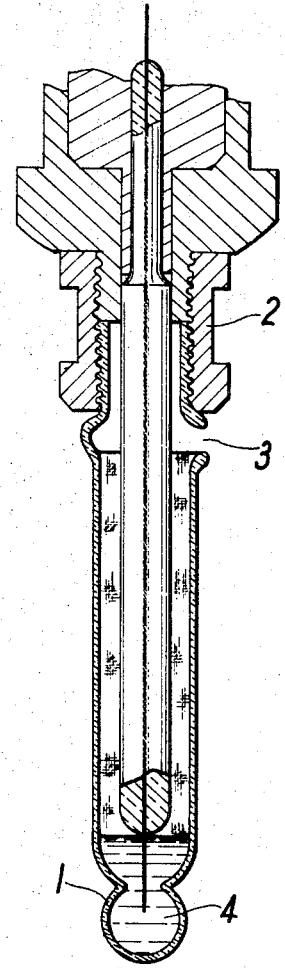
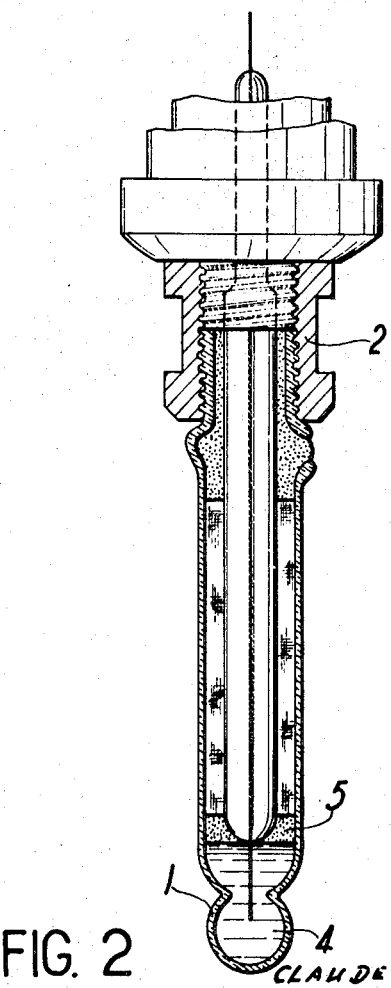
FIG. 1
FIG. 2
INVENTORS
CLAUDE FRICONNEAU
ALAIN LEIBOUTET
MARCEL LEPEINTRE
BY Craig & Antonelli
ATTORNEYS

3,551,315
ELECTRODES FOR THE MEASUREMENT OF pH VALUES UNDER PRESSURE
Claude Friconneau, Manosque, Alain Leboutet, Aix-en-Provence, and Marcel Lepeintre, Paris, France, assignors to Commissariat a l'Energie Atomique, Paris, France
Filed May 3, 1968, Ser. No. 726,431
Claims priority, application France, May 8, 1967, 105,600
Int. Cl. G01n 27/28, 27/36
U.S. Cl. 204—195
12 Claims

ABSTRACT OF THE DISCLOSURE

An improvement in electrodes for the measurement of pH values under pressure which essentially consists in covering the top surface of the electrolyte and of the insulating liquid with a thin layer of elastic resin and in filling the pocket which is already located above the insulating liquid with an elastic resin.

---

Figure 3:
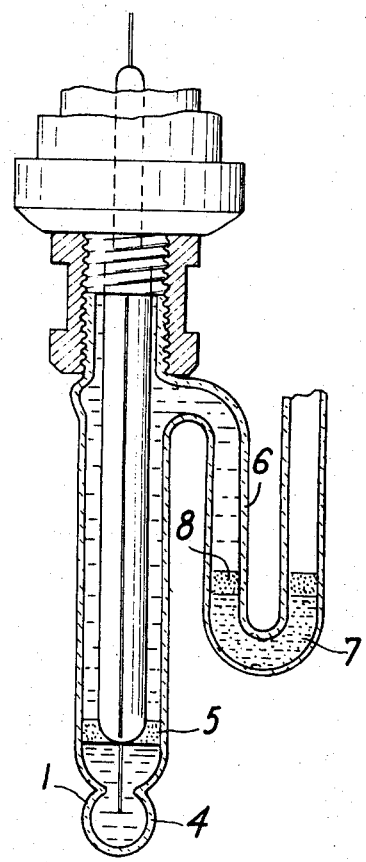

This invention relates to an improvement in electrodes for the measurement of pH values under pressure.

It is already a known practice to construct electrodes which are capable of withstanding high pressures. This property is achieved by balancing the internal and external pressure to which the electrode is subjected by means of a pressure-compensation hole located at the top of the electrode body. Transmission of pressure is carried out by means of a fluid which has a lower density than the internal electrolyte and which provides an insulation between the electrolyte and the external medium. Said fluid is advantageously constituted by a silicone oil. FIG. 1 of the accompanying drawings illustrates an electrode for the measurement of pH values under pressure.

However, an electrode of this type cannot be readily transported. Impacts or overturning of the electrode result in mixing of the oil and the electrolyte accompanied by contamination either of the bulb (measuring electrode) or of the junction (reference electrode) with oil, with the result that the electrode is no longer serviceable. In addition, the electrode must be filled in situ.

Moreover, by reason of the fact that the top level of the oil is relatively close to the pressure-compensation hole, there may take place either at the time of assembly or during operation a seepage of oil which contaminates the medium to be measured and can cause the ultimate destruction of the electrode by obstruction of the junction (reference electrode) or by soiling of the bulb (measuring electrode).

A further essential requirement of the electrodes referred-to above is that they must be employed in the upright position.

In order to overcome the disadvantages outlined above, the present invention proposes an electrode in which the insulating liquid is trapped and held motionless and in which the air pocket located above said liquid is eliminated.

The improvement in electrodes for measurement of pH values under pressure which is provided by the present invention consists in covering the top surface of the electrolyte and of the insulating liquid with a thin layer of elastic resin and in filling the air pocket located above the insulating liquid with an elastic resin.

The resin employed for the purpose of forming the layer which separates the internal electrolyte from the insulating liquid must be a liquid of lower density than the electrolyte prior to polymerization and must have a suitable viscosity in order that it may be injected by means of a syringe. This resin must be capable of polymerizing at the surface of the electrolyte and must be compatible with the insulating liquid which is to be located above.

The resin which covers the top surface of the insulating liquid must be lower in density than the insulating liquid employed and must be of suitable viscosity to permit of its introduction by means of a syringe. Said resin must also be capable of polymerizing in the presence of the insulating liquid.

The air pocket which is trapped above the surface of the insulating liquid at the level of the pressure-equalization hole is filled with an elastic resin which can be identical with the resin which covers the top surface of the insulating liquid.

A better understanding of the invention will be obtained by consideration of the following exemplified embodiment of an electrode in accordance with the invention, reference being made to the accompanying drawings.

The electrolyte is first placed in the bulb 1 of the electrode. In the case of electrodes with an interchangeable glass element, it is easier to place the electrolyte prior to screwing the glass element into the head 2 of the electrode. The elastic resin is then introduced by means of a syringe through the pressure-compensation hole so that a uniform film 5 having a thickness of 2 to 3 millimeters is formed above the electrolyte (as shown in FIG. 2) without trapping any air bubbles.

The resin employed is marketed by the Societe Industrielle des Silicones under the trade name of SI 182 and has a density of 1.05. This is a transparent and practically colorless resin and, by way of indication, polymerizes in 24 hours at ambient temperature, in 4 hours at 65° C. or in 1 hour at 100° C.

Said resin is accordingly allowed to polymerize. However, it should be pointed out that, if a resin is employed whose density is comprised between that of the insulating liquid and that of the electrolyte, the insulating liquid can be added and the preparation can be continued without first having to wait for the polymerization of the resin to proceed to completion.

There is then added the silicone oil which is necessary for providing electrical insulation. In this example, use was made of an oil known commercially as "SI 710" having a density in the range 1.10 to 1.15 and marketed by Societe Industriélle des Silicones.

Filling of the interior of the electrode with the resin SI 182 is completed at the level of the pressure-compensaiton hole. The film must have a thickness of at least 3 to 4 millimeters.

When the resin has polymerized, the electrode is laid horizontally, the pressure-compensation hole being directed upwards. The empty space between the preceding resin surface and the top of the internal cavity of the electrode is filled with resin up to the limit of overflow through the pressure-compensation hole while preventing the adhesion of air bubbles. When this resin has polymerized, the preparation of the electrode is completed and this latter is ready for use.

The improvement made in the present invention in electrodes for the measurement of pH values under pressure offers the following advantages:

easy transportation of the electrode;
utilization in any position with respect to the vertical.

By virtue of this improvement, the utilization of electrodes for measuring pH values under pressure does not present any greater difficulties than the utilization of conventional electrodes for pH measurement.

Provided that a mercury index is incorporated with the electrode, this latter can be employed in the presence of a gas such as $H_2S$ or $CO_2$. The mercury index is located in the elbow of a siphon, such as shown in FIG. 3.

To the outer tube of the glass electrode is connected a siphon 6, the other end of which is open to the external pressure. In the siphon elbow is located a mercury index 7. A layer 8 of resilient resin rests on top of said index and prevents mercury from penetrating into bulb 4. One of the applications of the electrode which may be mentioned by way of example is in the measurement of pH values in the petroleum industry for the separation of $H_2S$ and $CO_2$ from the hydrogen carbides.

The electrode in accordance with the invention is capable of withstanding pressures of several thousand bars and can be employed up to temperatures of the order of 150° C. with the glasses now available.

Among the many fields of application of these electrodes, there can be mentioned by way of example the paper industry for the measurement of pH values of solutions of $SO_2$ under pressure at about 130° C. the petroleum industry for petrochemistry, corrosion studies and purification of gases.

What we claim is:

1. An electrode for use, in association with a reference electrode, in measuring the pH under pressure, said electrode having a pressure-compensating hole in the body thereof, which comprises, an electrolyte disposed in one end portion of the electrode with a pressure-transmitting insulating liquid disposed between the electrolyte and the pressure-compensating hole wherein the electrolyte and the insulating liquid are separated by a layer of a synthetic resin covering the top surface of said electrolyte and the insulating liquid is retained in the body of the electrode by a second layer of a synthetic resin covering said insulating liquid, the arrangement being such that pressure is transmitting via the synthetic resin layers and the insulating fluid to equalize pressures inside and outside the electrode body.

2. The electrode of claim 1, characterized in that the resin has a suitable viscosity to permit its injection by means of a syringe.

3. The electrode of claim 1, characterized in that the layer which covers the top surface of the electrolyte has a thickness of 2 to 3 millimeters.

4. The electrode of claim 1, characterized in that the layer which covers the top portion of the insulating liquid has a thickness of at least 3 to 4 millimeters.

5. The electrode of claim 1, wherein the synthetic resin employed for separating the electrolyte from the insulating fluid has a lower density than the electrolyte prior to polymerization.

6. The electrode of claim 1, wherein the air pocket above the insulating liquid is filled with the syntheic resin.

7. The electrode of claim 6, wherein the synthetic resin which is used to fill the air pocket is the same as that which covers the top surface of the insulating liquid.

8. The electrode of claim 1, wherein the synthetic resin which covers the top surface of the insulating liquid is lower in density than the insulating liquid and capable of polymerizing in the presence of the insulating liquid.

9. The electrode of claim 1, wherein the synthetic resin is a silicone resin.

10. The electrode of claim 1, wherein the insulating liquid is a silicone oil.

11. An electrode for use, in association with a reference electrode, in measuring the pH under pressure, said electrode having a press-compensating hole communicating with a siphon in the shape of an elbow, a mercury index disposed in said elbow, which comprises an electrolyte disposed in one end portion of the electrode with a pressure-transmitting insulating liquid disposed between the electrolyte and the mercury index wherein the electrolyte and the insulating liquid are separated by a layer of a synthetic resin and the mercury index is separated from the insulating liquid by a second layer of synthetic resin and from the external pressures by a third layer of a synthetic resin, the arrangement being such that the pressure is transmitted via the synthetic resin layers and the insulating fluid to equalize pressures inside and outside the electrode body.

12. The electrode of claim 11, wherein the synthetic resin is a silicone resin.

References Cited

UNITED STATES PATENTS

| | | | |
|---|---|---|---|
| 1,439,956 | 12/1922 | Fuld | 136—133 |
| 3,114,085 | 12/1963 | Ruscetta et al. | 136—133 |
| 3,140,247 | 7/1964 | Fourine-Taillant-Vernioulet | 204—195.1 |
| 3,223,558 | 12/1965 | Purcell | 136—170 |
| 3,282,457 | 11/1966 | Sirois | 215—47 |

TA-HSUNG TUNG, Primary Examiner